United States Patent [19]

Wood et al.

[11] Patent Number: 4,842,389

[45] Date of Patent: Jun. 27, 1989

[54] VEHICLE DISPLAY SYSTEM USING A HOLOGRAPHIC WINDSHIELD PREPARED TO WITHSTAND LAMINATION PROCESS

[75] Inventors: Robert B. Wood, Hillsboro; Mark A. Thomas, Lake Oswego, both of Oreg.; James L. Valimont, Cheswick; H. Edward Littell, Jr., Gibsonia, both of Pa.; Glenn E. Freeman, Tarentum, Pa.

[73] Assignee: Flight Dynamics, Inc., Portland, Oreg.

[21] Appl. No.: 62,447

[22] Filed: Jun. 12, 1987

[51] Int. Cl.⁴ .................. G02B 5/32; G02B 27/14; B29C 71/00; C03C 27/12

[52] U.S. Cl. .................................. 350/3.7; 156/99; 264/346; 350/174

[58] Field of Search ............... 350/3.7, 174; 156/99, 156/106; 264/346

[56] References Cited

U.S. PATENT DOCUMENTS

| Re. 21,904 | 9/1941 | Land | 88/65 |
|---|---|---|---|
| D. 195,365 | 6/1963 | Holt | 350/174 X |
| 1,871,877 | 8/1932 | Buckman | 350/174 |
| 2,264,044 | 11/1941 | Lee | 116/57 |
| 2,641,159 | 6/1953 | Mihalakis | 88/24 |
| 2,750,833 | 6/1956 | Gross | 88/2.3 |
| 3,276,813 | 10/1966 | Shaw, Jr. | 296/97 |
| 3,446,916 | 5/1969 | Abel et al. | 178/7.85 |
| 3,523,847 | 8/1970 | Edwards | 156/99 |
| 3,840,289 | 10/1974 | Day | 350/174 |
| 3,848,974 | 11/1974 | Hosking et al. | 350/174 |
| 3,885,095 | 5/1975 | Wolfson et al. | 178/7.88 |
| 3,887,273 | 6/1975 | Griffiths | 350/174 X |
| 3,899,241 | 8/1975 | Malobicky, Jr. et al. | 350/174 |
| 3,940,204 | 2/1976 | Withrington | 434/43 X |
| 4,218,111 | 8/1980 | Withrington et al. | 350/3.72 |
| 4,232,943 | 11/1980 | Rogers | 350/202 |
| 4,261,635 | 4/1981 | Freeman | 350/3.72 |
| 4,356,052 | 10/1982 | Moraw et al. | 156/108 X |
| 4,398,799 | 8/1983 | Swift | 350/174 |
| 4,582,389 | 4/1986 | Wood et al. | 350/174 X |
| 4,613,200 | 9/1986 | Hartman | 350/174 X |
| 4,669,810 | 6/1987 | Wood | 350/3.7 |
| 4,688,879 | 8/1987 | Fairchild | 350/3.7 |
| 4,711,544 | 12/1987 | Iino et al. | 353/14 |
| 4,740,780 | 4/1988 | Brown et al. | 340/705 |

OTHER PUBLICATIONS

Kenji Horikiri, Fumio Ueda, Naotake Kumagai et al., "A Head-Up Display for Automotive Use", Proceedings of the SID, vol. 283, 1987, 287–290.

Brown, David A., "Simulator Aids Aircraft Design", Aviation Week & Space Technology, Feb. 7, 1972, 38–41.

Stein, Kenneth J., "Cat. 2 Jet Tests Head-Up Display", Aviation Week & Space Technology, Mar. 6, 1972, 53–55.

Primary Examiner—Bruce Y. Arnold
Assistant Examiner—David J. Edmondson
Attorney, Agent, or Firm—Stoel Rives Boley Jones & Grey

[57] ABSTRACT

A holographic windshield (10) includes an inner glass ply (36) having an inner flexible optically transparent inner interlayer (42) overlaid upon its inner surface (40). A middle flexible transparent interlayer (44) is overlaid upon the inner interlayer. The middle interlayer has an opening (46) formed therein. A flexible hologram (12) is fitted within the opening in the middle interlayer. An outer interlayer (48) is overlaid upon the middle interlayer including the flexible hologram. An outer glass ply (50) is overlaid upon the outer interlayer. The two glass plies are bonded together to form a unitary article. Also disclosed is a method for processing a holographic combiner to withstand a windshield construction process employing lamination techniques.

9 Claims, 2 Drawing Sheets

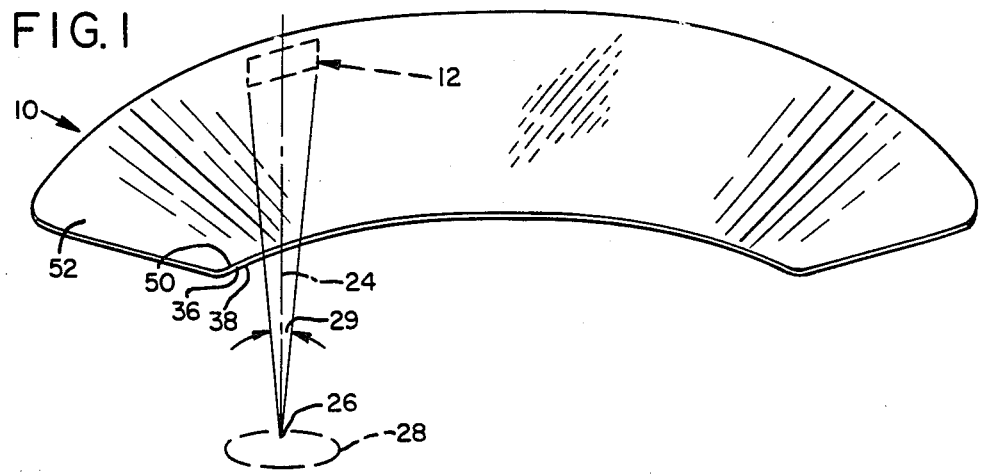
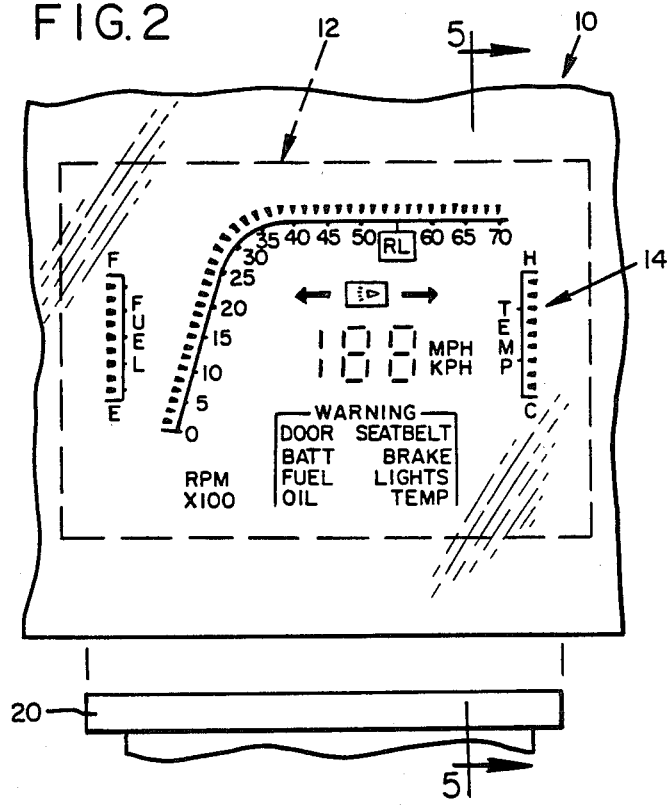
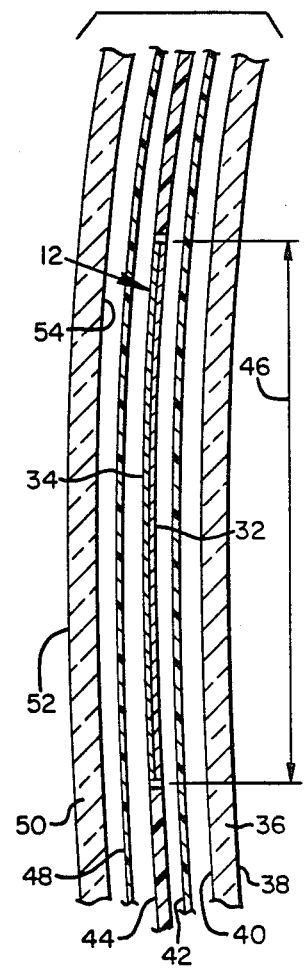

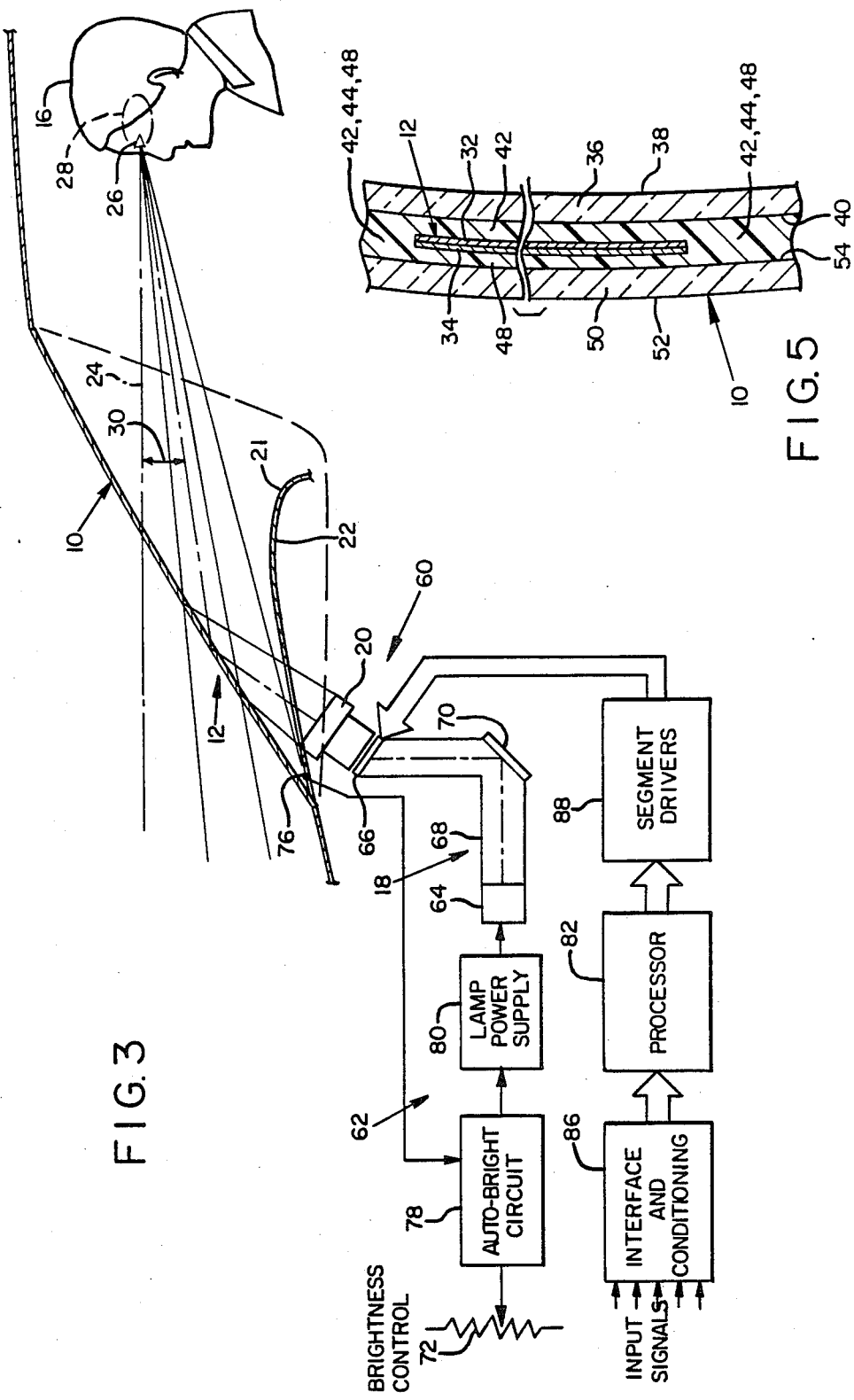

VEHICLE DISPLAY SYSTEM USING A HOLOGRAPHIC WINDSHIELD PREPARED TO WITHSTAND LAMINATION PROCESS

TECHNICAL FIELD

This invention pertains to head-up display systems that include holographic optical elements.

BACKGROUND INFORMATION

A head-up display system is used to display information to an observer while permitting the observer to simultaneously view the real world scene. In the past, head-up display systems have been incorporated into aircraft cockpits for displaying important flight information to a pilot. Head-up displays eliminate the need for the pilot to glance downwardly to view the information on an instrument panel.

An important component of a head-up display system is known as the combiner. The combiner is positioned forward of the observer and extends partly across the observer's view of the real world scene. The combiner is constructed to transmit light coming from the real world scene and reflect light information of a particular wavelength propagating from a luminous source. The light information typically is relayed to and is projected onto the combiner by way of suitable optical elements. The information-carrying light rays reflected by the combiner are typically collimated to present an image of the information at optical infinity. Accordingly, the observer can simultaneously view the real world scene and the displayed information without changing eye focus. The combiner can be shaped to provide the collimation, or a separate collimating optical element may be employed.

It is known that a particularly effective combiner can be constructed using a hologram or a holographic optical element. Several U.S. patents disclose holographic head-up display systems. See, for example, U.S. Pat. No. 4,582,389 entitled "Holographic Device," U.S. Pat. No. 4,613,200 entitled "Heads Up Display System with Holographic Dispersion Correcting," or U.S. Pat. No. 3,940,204 entitled "Optical Display Systems Utilizing Holographic Lenses."

Combiners used in prior art holographic head-up display systems most often comprise a hologram recorded in dichromated gelatin and mounted to a planar or nonplanar substrate of either transparent glass or plastic. The combiner is held with suitable support mechanisms within the observer's line of sight. When it is employed in an aircraft cockpit, the combiner is mounted between the observer and the aircraft windshield.

In a motor vehicle, the motorist views the forward outside real world scene through the windshield. Information pertaining to the operational status of the vehicle is typically displayed on an instrument panel located beneath the windshield and out of the motorist's view of the real world scene. It can be appreciated that a head-up display system providing important vehicle information, such as, for example, fuel supply and vehicle speed, positioned within the motorist's field of view through the windshield would permit the motorist to safely maintain eye contact with the real world scene while simultaneously viewing the display information.

SUMMARY OF THE INVENTION

The present invention is directed to a head-up display and provides a combiner element disposed between inner and outer plies of optically transparent material, such as glass or plastic, that are bonded together. The combiner includes a wavelength selective coating, such as a hologram. A preferred embodiment of the combiner formed in accordance with this invention is of the holographic type and is incorporated within the windshield of a motor vehicle. The holographic combiner particularly comprises the inner glass ply and an inner interlayer of flexible, transparent material covering one side of the inner glass ply. A middle interlayer of flexible, transparent material covers the inner interlayer and has an opening within which a hologram formed on a flexible substrate is fitted. An outer interlayer of flexible, transparent material covers the middle interlayer and the hologram fitted within the opening of the middle interlayer. The outer glass ply covers the outer interlayer. The inner glass ply, the inner and middle interlayers, the hologram, the outer interlayer, and the outer glass ply are laminated together to form a unitary windshield.

The holographic windshield formed in accordance with this invention cooperates with the elements of a head-up display system to produce an image of vehicle information in the motorist's field of view as the motorist observes the real world scene. Forming the windshield with the holographic combiner inside provides a clutter-free space between the motorist's eyes and the windshield because there is no need for separate mechanisms external to the windshield for mounting the combiner in front of the observer. The combiner is sealed within the windshield to protect against abrasion and deterioration that would otherwise result from exposure.

As another aspect of the invention, the hologram is processed in a manner that permits it to withstand the temperature and pressure extremes of the windshield lamination process.

BRIEF DESCRIPTION OF THE DRAWINGS

FIG. 1 is a top view of a holographic windshield formed in accordance with the present invention.

FIG. 2 is an enlarged front elevation view of exemplary symbology as would be displayed to an observer viewing the holographic windshield of FIG. 1.

FIG. 3 is a diagram of an optical display system installed in a motor vehicle and incorporating the holographic windshield of FIG. 1.

FIG. 4 is an exploded cross sectional view of the plies and interlayers used to form the holographic windshield of FIG. 1 by means of a lamination process.

FIG. 5 is an enlarged sectional view of the holographic windshield taken along lines 5—5 of FIG. 2.

DESCRIPTION OF A PREFERRED EMBODIMENT

With reference to FIGS. 1–3, the holographic windshield of the present invention comprises a motor vehicle windshield 10 that incorporates a combiner element 12 for reflecting information-carrying light rays in the form of symbology 14 into the field of view of a motorist 16. Combiner 12 includes a wavelength selective coating, preferably of the holographic type. The light rays emanate from an image source 18 and are projected onto the holographic combiner 12. The holographic combiner is manufactured to reflect wavelengths of light included within a predetermined narrow bandwidth. The predetermined bandwidth includes the wavelength corresponding to the wavelength and angle of incidence of the source light that is projected onto combiner 12.

A suitable projection and aberration correction optical assembly 20 is preferably mounted immediately beneath the upper surface 21 of the vehicle dashboard 22 and is positioned between the image source 18 and the holographic combiner 12 to project the light onto the combiner 12 so that the resulting image viewed by the motorist is focused at a distance preferably of between about three and fifteen meters forward of the vehicle windshield 10. The optical assembly 20 also compensates for spherical aberrations and optical aberrations introduced by the curvature of windshield 10. It will be appreciated that an overhead mounting of optical system 20 may be advantageously employed in certain vehicles, such as, for example, large trucks.

The image source 18 is preferably a transmissive liquid crystal display (LCD) that is adequately illuminated to project symbology-carrying light rays through the optical assembly 20 to the combiner 12. FIG. 2 shows exemplary projected symbology 14 in the form of numerical or graphical symbols representing vehicle speed, fuel level, engine RPM, temperature, and warning messages. The holographic combiner 12 is held within the laminae of the windshield 10 as described more fully below.

The holographic combiner 12 is arranged to display symbology 14 within a particular region relative to the motorist's direct line of sight. Specifically, line 24 in FIGS. 1 and 3 represents the motorist's direct line of sight as the motorist views the outside real world scene substantially straight ahead. Line of sight 24 extends through eye reference point 26 within an eye ellipse indicated by dashed outline 28. The eye reference point 26 is a geometrical point in space representing the horizontal center of the eye ellipse 28 and is the midpoint between the motorist's eyes.

The combiner 12 is preferably positioned so that the displayed symbology 14 is located within an angle 29 of approximately 12° centered about the motorist's direct line of sight as measured in the plane of FIG. 1. Preferably, the combiner 12 is located in the lower portion of the windshield 10 so that the center of the displayed information is located at an angle 30 of approximately 10° beneath the motorist's direct line of sight 24 as measured in the plane of FIG. 3. The preferred location of the combiner 12 provides an information display region that permits peripheral viewing of the outside real world scene as the motorist monitors the display. It is contemplated that alternative locations will also provide an effective head-up display for a vehicle windshield.

As mentioned, the holographic combiner 12 is laminated together with interlayers in transparent plies into the windshield 10. It has been found that conventionally manufactured holograms require modified processing to withstand the windshield lamination process, which is described more fully below, and that the hologram is more easily manufactured in plano form and then bent to conform to the final contour of the windshield after lamination. With reference to FIG. 4, attention is now turned to the preferred method of fabricating holograms that are incorporated into a laminated windshield for use as a combiner. In this portion of the description the terms "holographic combiner" and "hologram" are both used, the term "holographic combiner" indicating the hologram after it is positioned within the windshield to function as a combiner in a head-up display system.

The hologram is formed by deposition of a layer 32 of holographic recording material of between about 10 and 40 microns in thickness onto an optically transparent substrate 34. The substrate 34 is secured in a planar orientation by a support mechanism, such as a conventional vacuum holder, as the layer 32 of holographic recording material is deposited onto substrate 34. A suitable holographic recording material would be a photosensitive emulsion, such as, for example, a V.S.P. grade gelatin available from J. T. Baker Chemical Company. The substrate 34 is flexible and preferably is a polyester or polycarbonate film of approximately 0.125 mm in thickness. If the selected substrate is hydrophobic, a suitable subbing agent is applied to the surface of the substrate upon which the layer 32 of gelatin is deposited. The subbing agent provides the surface with hydrophilic characteristics that provide effective bonding between the gelatin and the substrate.

After it is deposited on the substrate, the layer 32 of gelatin is sensitized in a solution of ammonium dichromate, as is known in the art. The gelatin is then exposed to light to create the hologram. Preferably, the hologram is exposed using the techniques described in U.S. Pat. No. 4,582,389 entitled "Holographic Device," which is herein incorporated by reference. The holographic fringe lines preferably are substantially parallel to the surface of substrate 34 such that there are fewer than 2 fringe line pairs per millimeter intersecting the surface of substrate 34. This provides a hologram with essentially zero optical power and no flare.

Once exposed, the hologram is processed in a conventional manner. One acceptable processing procedure comprises washing the hologram for fifteen minutes in running water having a temperture of between 16° and 20° C.; soaking the hologram in isopropanol for 2 minutes with continuous agitation; and drying the hologram in a vacuum oven for 2 hours at a temperature of at least 100° C.

After the initial processing of the hologram as just described, secondary processing of the hologram is undertaken to ensure that it will withstand the windshield lamination process. The secondary processing entails an optional step of applying a moisture barrier to the hologram, followed by heat stablizing the hologram and storing it in a relatively low humidity environment.

In particular, the hologram is dipped into a solution of a highly volatile solvent and a solute that remains as an effective moisture barrier covering the hologram surface after the solvent is evaporated. The moisture barrier serves as a humidity stabilizing agent for the hologram during the lamination process. A preferred solution is a 2% by weight solution of a fluorocarbon powder based on a polychlorotrifluoroethylene resin (such as that manufactured by M. W. Kellogg Company under the trademark KEL-F) dissolved in liquid freon. After the hologram is dipped in the solution, the freon is evaporated leaving the KEL-F moisture barrier coating the hologram surface. Although a 2% solution is preferred, acceptable results can be obtained with a 0.5% to 5% solution. The above-described deposition of a moisture barrier would be unnecessary if the interlayers used in the lamination process are made of sufficiently dry material.

After the moisture barrier has been applied, the hologram is heat-stabilized by placing it in a vacuum oven and heating the hologram from room temperature to a peak temperature of between 120° C. and 140° C., with 135° C. being the preferred temperature. The hologram is heated to reach a peak temperature within 30 to 90 minutes, with 60 minutes being the preferred time to reach the peak temperature. The hologram is then slowly cooled for 60 to 120 minutes until it reaches room temperature, the hologram preferably reaching room temperature after 90 minutes.

Finally, the hologram is stored in a environment having a relative humidity of less than about 30% and a temperature of between about 20° C. and 30° C. until it is laminated into the windshield. After the secondary processing, the hologram is approximately 0.15 mm thick.

Turning now to the particular process for forming a holographic windshield in accordance with this invention, the windshield 10 comprises an inner glass ply 36 preformed into the curvature of the windshield by conventional means. The inner glass ply 36 is approximately 2.3 mm thick and has an outer surface 38 that faces the motorist after the windshield is installed in the vehicle. The inner glass ply 36 also has an inner surface 40 upon which a flexible transparent primer or inner interlayer 42 is overlaid. The inner interlayer 42 is made of a thin, dry, flexible plastic material, such as a 0.38 mm sheet of polyurethane or plasticized polyvinyl butyral. A middle flexible, transparent interlayer 44, having a 0.15 mm thickness corresponding to the thickness of the hologram, is next overlaid upon the inner interlayer 42. The middle interlayer 44 is formed of a sheet of dried polyurethane or plasticized polyvinyl butyral. The middle interlayer 44 has an opening 46 formed in it. The opening 46 is sized and located to correspond to the preferred location and size of the holographic combiner 12 within the windshield 10, as was described above. The hologram 12 is fitted into the opening 46.

An outer flexible, transparent interlayer 48 is next overlaid upon the middle interlayer 44 with the hologram in place within opening 46. The outer interlayer 48 is formed of a dry, flexible plastic material, such as a 0.38 mm sheet of polyurethane or plasticized polyvinyl butyral. Each of the interlayers 42, 44, and 48 is handled or applied in a manner to avoid wrinkling or differential stretching.

An outer glass ply 50 having a 2.3 mm thickness is placed over the outer interlayer 48. Outer glass ply 50 has an outer surface 52 that is exposed to the outside environment of the vehicle and an inner surface 54 of preformed curvature that complements the curvature of inner surface 40 of inner glass ply 36. It will be appreciated that plies 36 and 50 could be made of a plastic or other suitable optically transparent material.

Excess plastic is cut away from the entire assembly of interlayers and glass plies described above. The assembly is then prepressed, for example, by passing it between a pair of prepressing rollers at a temperature of 65° C. to 107° C. Prepressing removes air from between the interfaces of the various interlayers and sheets and seals at least the peripheral edge of the assembly. One suitable prepressing device is depicted in U.S. Pat. No. 3,351,001 to Achkio.

The prepressed assembly is then laminated in an air autoclave for approximately 2 hours at a temperature of 120° to 160° C. and a simultaneously applied pressure of 12.3 to 15.8 Kg/cm$^2$.

The lamination process causes the interlayers 42, 44, and 48 to blend together and thereby form a cover for both surfaces of hologram 12, as shown in FIG. 5. Following lamination, the inner interlayer 42 and outer interlayer 48 are defined only along the surfaces of hologram 12, and the middle interlayer 44 is competely blended together with the material that formed interlayers 42 and 48.

FIG. 3 is a block diagram of an optical display system 60 that includes holographic windshield 10, which is installed in a motor vehicle. Optical display system 60 includes an optical and electronic processing subsystem 62 that is preferably positioned below the dashboard 22 of the vehicle and the windshield 10 that holds the holographic combiner element 12. Optical lens projection system 20 corrects for the compound curvatures of the windshield and projects display symbology for reflection off of the hologram 12, which is embedded within the windshield 10, toward the observer 16.

More specifically, processing subsystem 62 includes the image source 18 that comprises a light source 64 and a liquid crystal display 66. Light source 64 and liquid crystal display 66 are separated by a light transmitting means or tubular light pipe 68, which has a right angle bend. Light source 64 is preferably a high intensity lamp, such as, for example, 12 volt halogen lamp, which dissipates about 75 watts of heat at its maximum brightness. Liquid crystal display 66 comprises a matrix of transmissive segments that selectively transmit light to synthesize a display image.

Light pipe 68 enables the placement of light source 64 at a location where the heat generated by the light source can be dissipated outside of the passenger compartment of the vehicle. Light pipe 68 is preferably constructed of aluminum tubing that is designed to efficiently transfer light emitted from light source 64 to liquid crystal display 66. The inner surface of light pipe 68 is preferably polished, nickel plated, or extruded such that the surface finish is smooth and shiny, thereby maximizing the light transmission. The use of aluminum promotes the efficient dissipation of heat generated by light source 64.

Heating of liquid crystal display 66 by lamp 64 is further minimized by the use of a cold mirror 70, which is positioned at the right angle bend in light pipe 68. In this configuration, cold mirror 70 functions as a folding mirror between light source 64 and liquid crystal display 66. Cold mirror 70 reflects visible light but transmits infrared light, thereby minimizing the heating of liquid crystal display 66. It will be appreciated that cold mirror 70 could be eliminated if light pipe 68 is of sufficient length to dissipate the heat generated by light source 64.

Liquid crystal display 66 is of the transmissive type and is back-illuminated by the high intensity light source 64. The intensity of light emitted by light source 64 can be changed by manually adjusting a brightness control potentiometer 72 or can be set automatically to maintain a fixed display contrast ratio (i.e., the ratio between the display brightness and the outside world brightness) independent of ambient or background brightness. Maintaining a fixed display contrast ratio is accomplished by an ambient light sensor diode 76 whose output current changes as a function of changes in ambient light intensity. Auto-brightness circuit 78 senses a change in the current flowing through sensor diode 76 and delivers an output signal to a lamp power supply 80 whose output voltage changes in response to the magnitude of the output signal of auto-brightness circuit 78. The intensity of light source 64 changes in response to the output voltage of power supply 80 to maintain a fixed display contrast ratio.

The transmissivity of the segments of liquid crystal display 66 is controlled by a processor circuit 82 that provides appropriate output signals whose voltages represent display information indicative of the status of a set of input signals. The input signals are applied to an interface circuit 86, and each one of them is read once every 60 milliseconds by processor 82. The input signals are characterized by one of three types of formats, and interface circuit 86 conditions the input signals for delivery to processor 82. The format of the input signals indicates whether they are frequency dependent, or of the analog or digital types. The vehicle speed and tachometer readings would be examples of frequency dependent input signals; the fuel and oil levels, engine temperature, or battery condition would be examples of analog signals; and the status of seatbelts, doors, brake, lights, high beams, and turn signals would be examples of digital signals. The output signals of processor 82 are applied to a segment driver circuit 88, which provides an output current of sufficient magnitude to drive the individual segments of liquid crystal display 66.

The projection and aberration correction optical assembly 20 projects the image information forward of the vehicle and consists of multiple lens elements fabricated from either plastic and/or glass materials. Optical assembly 20 also compensates for spherical aberrations and optical aberrations resulting from the complex windshield curvature. The design of optical assembly 20 includes a characterization of the effect of the aspheric shape of the windshield on the image information emanating from liquid crystal display 66 and the geometry dictated by the placement of the system in the vehicle. A suitable optical assembly 20 can be designed in accordance with conventional techniques by those having ordinary skill in the art. It will be appreciated that windshield curvature aberration correction would be unnecessary in vehicles, such as certain trucks, that have flat windshields.

While the present invention has been described in relation to a preferred embodiment, it is to be understood that various alternatives, substitution of equivalents, or other changes can be made without departing from the underlying principles of the invention. For example, an image source other than a liquid crystal display device could be used in implementing the invention. The scope of the invention should be determined, therefore, only with reference to the following claims.

We claim:

1. A laminated vehicle windshield assembly, comprising:
   an optically transparent inner ply;
   a first optically transparent interlayer covering one side of the inner ply;
   a second optically transparent interlayer covering the first interlayer, the second interlayer having an opening formed therein;
   exposed photosensitive material having wavelength selective properties and fitted within the opening of the second interlayer;
   a third optically transparent interlayer covering the second interlayer and the photosensitive material fitted within the opening in the second interlayer; and
   an optically transparent outer ply covering the third interlayer,
   thereby to provide a laminated windshield assembly that is capable of maintaining the wavelength selective properties of the photosensitive material during a lamination process.

2. The windshield assembly of claim 1 in which the photosensitive material comprises holographic recording material.

3. The windshield assembly of claim 2 in which the holographic recording material is deposited on a flexible substrate.

4. A laminated vehicle windshield, comprising:
   first and second optically transparent plies, the first and second plies having opposed inner surfaces;
   exposed photosensitive material having wavelength selective properties and positioned in a region between the inner surfaces of the first and second plies, the photosensitive material having first and second major surfaces; and
   an optically transparent, flexible interlayer ply covering one of the first and second major surfaces of the photosensitive material and positioned between the inner surfaces of the first and second plies, the interlayer ply cooperating with the first and second plies and the photosensitive material to provide a laminated vehicle windshield substantially of optically transparent character in the region occupied by the photosensitive material.

5. The windshield of claim 4 in which the photosensitive material comprises holographic recording material.

6. The windshield of claim 5 in which the holographic recording material is deposited on an optically transparent substrate comprising a flexible material that is adaptable to conform to the contour of the plies.

7. The windshield of claim 4 in which the photosensitive material comprises holographic recording material of thermally stabilized character that maintains the wavelength selective properties thereof over a relatively broad range of elevated temperatures.

8. The windshield of claim 4 in which the interlayer ply is a first interlayer ply covering the first major surface of the photosensitive material and in which the windshield further comprises a second optically transparent, flexible interlayer ply covering the second major surface of the photosensitive material.

9. The windshield of claim 8 in which the photosensitive material comprises holographic recording material.

10. The windshield of claim 9 in which the photosensitive material is deposited on an optically transparent substrate of flexible material that is adaptable to conform to the contour of the plies.

11. The windshield of claim 4 in which the photosensitive material is of thermally stabilized character that maintains the wavelength selective properties thereof over a relatively broad range of elevated temperatures.

12. The windshield of claim 4 in which the first and second plies comprise glass material.

13. The windshield of claim 12 in which the photosensitive material comprises holographic recording material.

14. The windshield of claim 4 in which the flexible ply comprises polyurethane.

15. The windshield of claim 4 in which the flexible ply comprises polyvinyl butyral.

16. An optical display system for installation in a vehicle having a windshield through which an observer can view an outside world scene, the windshield including an optically transparent ply and an optically transparent, flexible ply having opposed inner surfaces, the system comprising:

image source means for providing light image information;

optical element means for displaying the image information to the observer, the optical element means comprising exposed photosensitive material having wavelength selective properties, the photosensitive material being positioned between and covered by the inner surfaces of the ply and the flexible ply, the photosensitive material having been exposed to reflect the light image information and transmit incident light carrying the outside world scene; and image projecting and aberration correcting means for directing the image information toward the optical element means and correcting for optical aberrations in the image information, thereby to display the image information and transmit the outside world scene to the observer.

17. The display system of claim 16 in which the image source means comprises a liquid crystal display and a light source for illuminating the liquid crystal display.

18. The display system of claim 17, further comprising light transfer means for transmitting light emitted by the light source to the liquid crystal display.

19. The display system of claim 18 in which the light transfer means comprises a tubular light pipe whose inner surface has reflection properties that promote light transmission.

20. The display system of claim 19 in which the light transfer means comprises a tubular light pipe having heat conduction properties that dissipate heat produced by the light source.

21. The display system of claim 16 in which the photosensitive material is deposited on a flexible substrate that is adaptable to conform to the contour of the plies.

22. The display system of claim 21 in which the photosensitive material comprises holographic recording material.

23. The display system of claim 16 in which the flexible ply has an outer surface and in which the windshield comprises two optically transparent plies, one ply of which covering the outer surface of the flexible ply.

24. The windshield of claim 16 in which the ply comprises glass material.

25. A laminated vehicle windshield, comprising:

an optically transparent ply having a predetermined contour and a major surface;

exposed photosensitive material having light reflecting, wavelength selective properties and first and second major surfaces;

optically transparent material positioned between the major surface of the ply and the first major surface of the photosensitive material; and an optically transparent, flexible ply covering the second major surface of the photosensitive material and cooperating with the ply, the photosensitive material, and the flexible ply to provide a laminated vehicle windshield substantially of optically transparent character.

26. The windshield of claim 25 in which the photosensitive material comprises holographic recording material.

27. The windshield of claim 25 in which the photosensitive material comprises holographic recording material and which further comprises a substrate on which the holographic recording material is deposited, the substrate comprising a flexible material that is adaptable to conform to the contour of the ply.

28. The windshield of claim 25, further comprising an optically transparent ply covering the flexible ply.

29. The windshield of claim 25 in which the photosensitive material is of thermally stabilized character that maintains the wavelength selective properties thereof over a relatively broad range of elevated temperatures.

30. The windshield of claim 25 in which the ply comprises glass material.

31. The windshield of claim 25 in which the flexible ply comprises polyurethane.

32. The windshield of claim 25 in which the flexible ply comprises polyvinyl butyral.

33. A laminated vehicle windshield, comprising:

first and second optically transparent plies, the first and second plies having opposed inner surfaces; and exposed photosensitive material having wavelength selective properties and positioned in a region between the opposed inner surfaces of the first and second plies, the photosensitive material being of thermally stabilized character that maintains the wavelength selective properties thereof over a relatively broad range of elevated temperatures, and the plies and the photosensitive material cooperating to provide a laminated vehicle windshield substantially of optically transparent character in the region occupied by the photosensitive material.

34. The windshield of claim 33 in which the photosensitive material has light reflecting wavelength selective properties.

35. The windshield of claim 33 in which the photosensitive material is deposited on a flexible substrate that is adaptable to conform to the contour of the plies.

36. The windshield of claim 33 in which the photosensitive material comprises holographic recording material.

37. The windshield of claim 36 in which the holographic recording material is deposited on a flexible substrate that is adaptable to conform to the contour of the plies.

38. The windshield of claim 33 in which the first and second plies comprise glass material.

39. The windshield of claim 33 in which the photosensitive material has a major surface and which further comprises an optically transparent, flexible ply covering the major surface of the photosensitive material and positioned between the first and second plies.

\* \* \* \* \*